United States Patent

[11] 3,622,888

[72] Inventors Alain Robert; Henri Charvier, both of Paris, France

[21] Appl. No. 820,055
[22] Filed Apr. 29, 1969
[45] Patented Nov. 23, 1971
[73] Assignee Thomson-CSF
[32] Priority May 31, 1968
[33] France
[31] 153505

[54] MICROWAVE RADIOMETERS

3 Claims, 4 Drawing Figs.

[52] U.S. Cl. .................... 325/363
[51] Int. Cl. .................... H04b 1/100
[50] Field of Search .................... 343/703; 324/58.5; 325/363, 67

[56] References Cited

UNITED STATES PATENTS

| | | | |
|---|---|---|---|
| 3,109,988 | 11/1963 | Hoover | 343/703 |
| 3,325,644 | 6/1967 | Frye et al. | 325/363 |

*Primary Examiner*—Richard Murray
*Assistant Examiner*—Anthony H. Handal
*Attorney*—Cushman, Darby & Cushman

ABSTRACT: An improvement in hetrodyne-type microwave radiometers, comprising a polarization changer for passing, with crossed polarizations, the signals respectively coming from a radio source and a reference source, a first rotator, such as of the Faraday type, operated at low frequency, an mode suppressor and a mixer connected to a local oscillator, wherein a second rotator, such as of the Faraday type producing a constant rotation in the polarization, is arranged between the mode suppressor and said mixer.

MICROWAVE RADIOMETERS

The present invention relates to heterodyne-type radiometers which enable the microwave radiation from any emissive body to be measured. Such objects will be hereinafter called radio-sources.

Such radiometers effect a comparison between the radiation produced by a radio source and the radiation produced from a reference source of known temperature. The signals emitted by these sources are respectively fed to two inputs of a device which passes them with crossed linear polarizations. Such a device will be called hereinafter a polarization multiplexer since it achieves in a way a multiplexing of these two signals.

A system comprising a ferrite rotator, such as of the Faraday type, excited at low frequency, and if need be an absorbing fin, will alternately allow either one or the other of the signals to pass. The resultant signal is supplied to a mixer. The local oscillator connected to this mixer can produce in the receiver a noise signal which is superimposed upon the signal to be measured, bringing about a very substantial reduction in the sensitivity of the radiometer. The arrangements used hitherto in order to palliate this drawback have consisted in using symmetrical mixers with very high decoupling and in improving the performance of the various microwave elements. Precautions of this kind, although by no means fully effective, nevertheless made it possible to use local oscillators such as klystrons or backward-wave travelling wave tubes, without experiencing any substantial decrease in sensitivity of the associated radiometers; however, they become absolutely insufficient if it is necessary to employ local oscillators of the kind comprising a pilot oscillator followed by frequency multiplier stages or other local oscillators using solid state elements such as varactors, Gunn diodes, etc. Actually, such local oscillators have a generally high noise level and on the other hand produce a spectrum made up of a number of lines.

It is therefore an object of the invention to improve the sensitivity of radiometers in situations where it is impaired by the noise generated by a local oscillator.

According to the invention there is provided an heterodyne-type microwave radiometer for measuring the microwave radiations from an emissive body comprising: an aerial for receiving said radiations thus supplying a first signal; a reference emissive source for supplying a second signal; a polarization multiplexer having two inputs respectively connected to said aerial and to said source and an output for providing said first and said second signals with respective crossed linear polarizations; a first rotator coupled to said output; first means connected to said rotator for controlling the rotation of the polarization direction produced by said gyrator, for said rotation to be alternatively substantially equal to $\pm \pi/4$; a mode suppressor comprising an absorbing fin and coupled to said rotator; a second rotator coupled to the output of said mode suppressor; second means for controlling the rotation of the polarization direction produced by said second rotator, for said latter rotation to be substantially equal to $(2K+1)\,\pi/4$, where $k$ is an integer which can be positive, negative or equal to zero; a local oscillator; a mixer having two inputs respectively coupled to said second rotator and said local oscillator for generating an intermediate frequency signal; and intermediate and low frequency circuits for processing said intermediate frequency signal.

For a better understanding of the invention and to show how the same may be carried into effect reference will be made to the drawings accompanying the ensuing description and in which.

Figure 4:
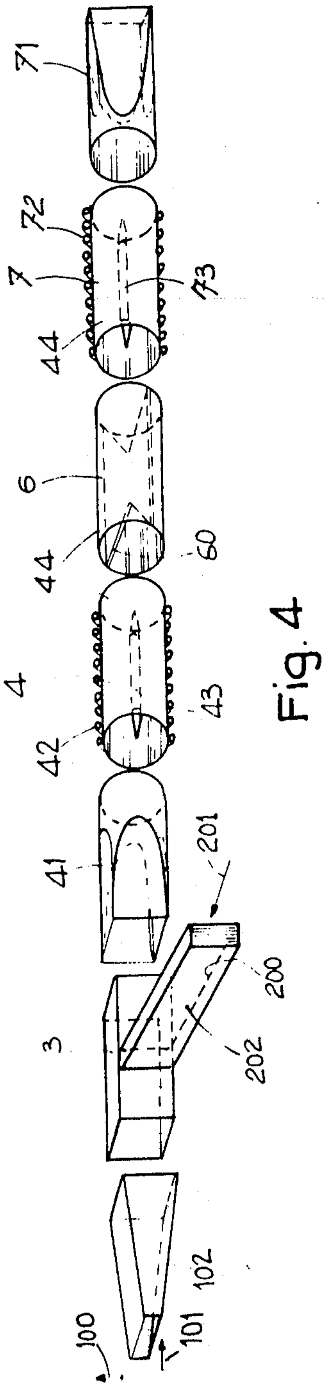

FIG. 4 schematically illustrates an embodiment of part of a radiometer according to the invention.

Figure 1:
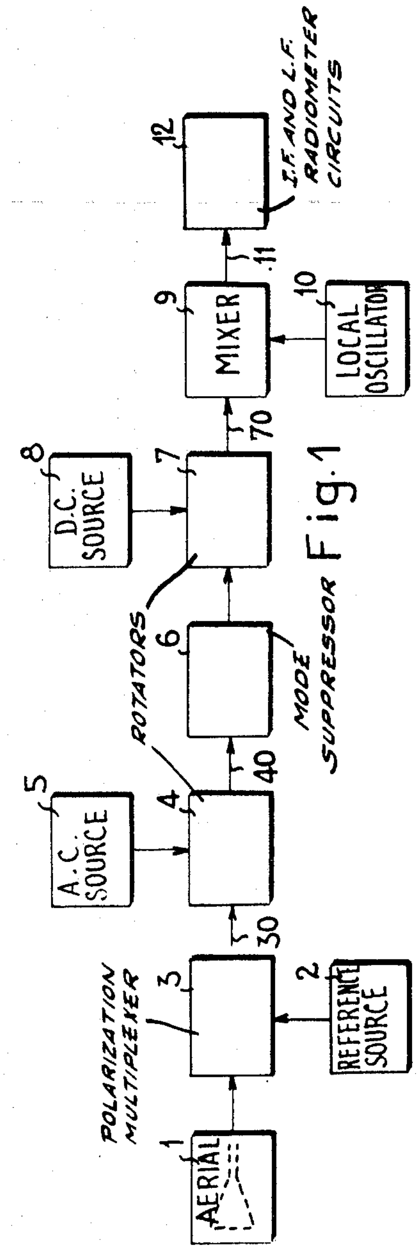
FIG. 1 illustrates a block diagram of a radiometer according to the invention.

In FIG. 1, a block diagram of one embodiment of the radiometer according to the invention has been shown, the conventional circuitry of this radiometer, following the mixer, not having been shown in detail.

The signals produced by a radio source are received by an aerial 1. The latter is connected to a first input of a polarization multiplexer 3, whose other input receives the signals produced by a local reference source 2 of known temperature.

The respective signals produced by the radio source and the reference source, appear at the output 30 of the polarization multiplexer 3 in the form of linearly polarized waves whose respective polarization vectors are mutually perpendicular.

These waves are passed to a rotator 4, for example of ferrite kind, the excitation winding of which is supplied with the current produced by a low-frequency AC source 5.

This rotator is followed by a mode suppressor 6 comprising an absorbing fin. The assembly of the rotator 4 and the absorbing fin 6 forms a system which alternately passes one or other of the received waves and absorbs the particular one not passed.

The transmitted wave passes through a second rotator, such as of the Faraday type, 7 which produces rotation of the polarization through a fixed angle. This, as shown in the present instance, may be a ferrite rotator the excitation winding of which is supplied with a current from a DC source 8. The output 70 of this rotator is connected to a first input of a mixer 9, whose other input is connected to a local oscillator 10. The output 11 of the mixer is connected to the remainder of the circuits of the radiometer 12, which are entirely conventional and comprise all the IF and LF circuits.

The operation of the system of FIG. 1 will now be described with reference to FIG. 2, where the arrow 13 indicates the direction of propagation of the signals, and to FIG. 3.

The signals produced by the radio source and picked up by the aerial 1, and the signals coming from the reference source 2, appear at the output 30 of the polarization multiplexer and are propagated through a square-section waveguide, in the form of crossed, linearly polarized waves with respective polarization vectors 100 and 200.

The ferrite rotator 4 receives from the source 5, at its control winding, a current $\pm$ I of magnitude I, such that the vectors 100 and 200 undergo a rotation corresponding to the direction of flow of the current I and equal to $\pm 45°$. At the output 40 of the circular waveguide section, the vectors 100 and 200 will, for example, have the relative position shown in FIG. 2, it being assumed that the rotator 4 has produced a rotation of $+ 45°$. The absorbing fin 6 absorbs the waves whose polarization is parallel to the direction PP'. The wave which is polarized along the vector 100 is thus passed, whereas the wave with polarization along the vector 200 is heavily absorbed.

During the following alternation of the current supplied by the source 5, the wave with vector 100 will be absorbed and the wave with vector 200 passed.

The rotator 7 produces a fixed rotation of 45° (for example $+45°$ in the present case) in the polarization of the wave transmitted by the system made up of rotator 4 and the absorbing fin 6.

Figure 2:
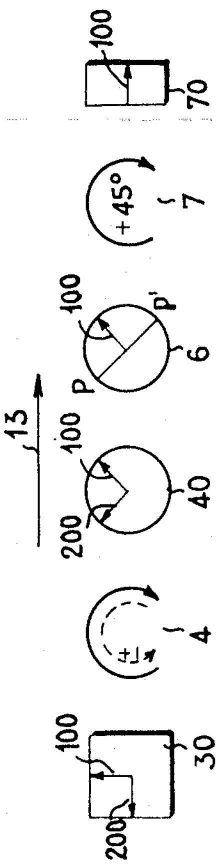
FIGS. 2 and 3 are explanatory diagrams.
Figure 3:
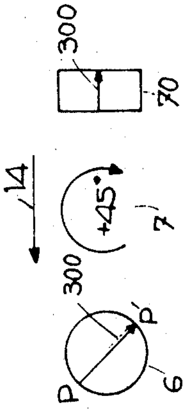

In the case of FIG. 2, the vector 100 is obtained at the output 70 of the rotator 7. By using the rotator 7, it is possible to reduce very substantially the influence of the noise generated by the local oscillator 10. Actually, the decoupling of the mixer 9 cannot be 100 percent and is rarely better than 20 decibels. The noise generated by the local oscillator can therefore, in the absence of the rotator 7, be passed to the rotator 4 and then reflected by the same with the same low frequency modulation as the useful signal, because of the modulation, at this frequency, of the coefficient of reflection of the rotator 4 due to the switching rate of said rotator. The thus reflected noise signal can therefore appear with the useful signal at the input of the mixer.

Thanks to the use of the gyrator 7, this possibility is excluded. In other words, the vector 300 (FIG. 3) representative of the major part of the noise signal fraction propagated in a direction opposite to the signal, i.e. in the direction indicated by the arrow 14 in FIG. 3, undergoes a rotation of $+ 45°$ as a result of passage through the rotator 7.

Consequently, the vector 300 appears parallel to the direction PP′ when it reaches the absorbing fin 6 and the noise fraction represented by this vector 300 is therefore virtually completely absorbed by the fin 6, preventing any reflection on the rotator 4. The absorbing fin 6 thus performs a dual function since it absorbs on one hand the undesired signal (alternatively the signal from the radio source or that from the reference source) and on the other hand the noise generated by the local oscillator which might otherwise be superimposed upon the useful modulated signal.

Of course, it is obvious that the same result will be obtained if rotator 7 produces more generally a rotation of $(2k+1)\pi/4$ where $k$ can be positive or negative integer or zero.

FIG. 4 shows an exploded and schematic view of an embodiment of part of the radiometer in accordance with the invention. The signal from the radio source, propagating in the direction of the arrow 101, is supplied to a first input 102 of the polarization multiplexer 3 comprising a square-section waveguide. The signal from the reference source, propagating in the direction of the arrow 201, is supplied to a second input 202 of the multiplexer. A waveguide junction 41 matches the system to a circular waveguide section. The rotator 4, the absorbing fin 6 and the rotator 7 are grouped together to form a single assembly in the circular waveguide 44. The rotator 4 comprises a ferrite element 43 and a control winding 42. The absorbing fin 6 is formed by a strip 60 for example of metallized mica, located at 45° to the planes of polarization of the waves coming from the multiplexer 3. The rotator 7 also comprises a ferrite element 73 and a control winding 72. A junction 71 matches the circular section to a rectangular waveguide section. Thanks to the grouping of the two rotators and the absorbing fin, in one and the same circular waveguide section, the addition of a second rotator 7 requires no additional waveguide junction which would otherwise introduce additional losses.

With one embodiment of the radiometer of the invention it has been possible to achieve a gain in sensitivity, the latter being impaired by noise generated by the local oscillator, of 28 decibels.

This radiometer, operating at 60gc./s., it was also observed that the supplementary losses introduced by the improvement in accordance with the invention, amounted to only 1.2 decibels.

Of course, the invention is not limited to the embodiments described and shown which were given solely by way of example.

What is claimed is:

1. An heterodyne-type microwave radiometer for measuring the microwave radiations from an emissive body comprising: an aerial for receiving said radiations thus supplying a first signal; a reference emissive source for supplying a second signal; a polarization multiplexer having two inputs respectively connected to said aerial and to said source and an output for providing said first and said second signals with respective crossed linear polarizations; a first (gyrator) rotator coupled to said output; first means connected to said (gyrator) rotator, for controlling the rotation of the polarization direction produced by said (gyrator) rotator, for rotation to be alternatively substantially equal to $\pm\pi/4$; a mode suppressor comprising an absorbing fin and coupled to said rotator; a second (gyrator) rotator coupled to the output of said mode suppressor; second means for controlling the rotation of the polarization direction produced by said second (gyrator) rotator for said latter rotation to be substantially equal to $(2k+1)\pi/4$, where $k$ is an integer which can be positive, negative or equal to zero; a local oscillator; a mixer having two inputs respectively coupled to said second (gyrator) rotator and said local oscillator for generating an intermediate frequency signal; and intermediate and low frequency circuits for processing said intermediate frequency signal.

2. A radiometer as claimed in claim 1, wherein said first and second (gyrators) rotators are ferrite (gyrators) rotators, each comprising a ferrite element in a waveguide and a control winding surrounding said waveguide, and wherein said first means comprise an AC supply source connected to the control winding of said first (gyrator) rotator and said second means comprise a DC supply source connected to the control winding of said second (gyrator) rotator.

3. A radiometer as claimed in claim 2, wherein said ferrite elements of said first and second (gyrators) rotators and said absorbing fin of said mode suppressor are arranged in the same circular waveguide.

* * * * *